United States Patent [19]
Fiala

[11] 3,840,248
[45] Oct. 8, 1974

[54] SELF-TENSIONING KNEE BELT SAFETY DEVICE

[75] Inventor: Ernst Fiala, Braunschweig, Austria

[73] Assignee: Volkswagenwerk Akiengesellschaft, Wolfsburg, Germany

[22] Filed: Feb. 20, 1973

[21] Appl. No.: 333,999

[30] Foreign Application Priority Data
Feb. 26, 1972 Germany............................ 2209121

[52] U.S. Cl. .......................................... 280/150 SB
[51] Int. Cl. ............................................ B60r 21/02
[58] Field of Search..................... 280/150 SB, 150 B

[56] References Cited
UNITED STATES PATENTS

| | | | |
|---|---|---|---|
| 3,022,089 | 2/1962 | Botar | 280/150 SB |
| 3,262,716 | 7/1966 | Graham | 280/150 B |
| 3,727,944 | 4/1973 | Wize | 280/150 SB |

FOREIGN PATENTS OR APPLICATIONS

| | | | |
|---|---|---|---|
| 2,117,840 | 6/1971 | Germany | 280/150 SB |

Primary Examiner—Robert R. Song
Attorney, Agent, or Firm—Brumbaugh, Graves, Donohue & Raymond

[57] ABSTRACT

An improved knee belt safety device allows the occupant of a vehicle freedom of movement under ordinary circumstances but secures his legs to the seat of the vehicle in the event of a collision. One end of the knee belt is connected to a tensioning device and the other end is connected through holding loops to a pivotal arm. The holding loops maintain the belt at a distance from the occupant of the vehicle. On impact the tensioning device is activated pulling the belt from the holding loops and securing the occupant's knees to the seat. Easy access to the seats of the vehicle is provided by connecting the pivotal arm so that it will swing out of the way when the door of the vehicle is open or when the back rest of the front seat is pivoted forward for entry to the rear seats.

5 Claims, 2 Drawing Figures

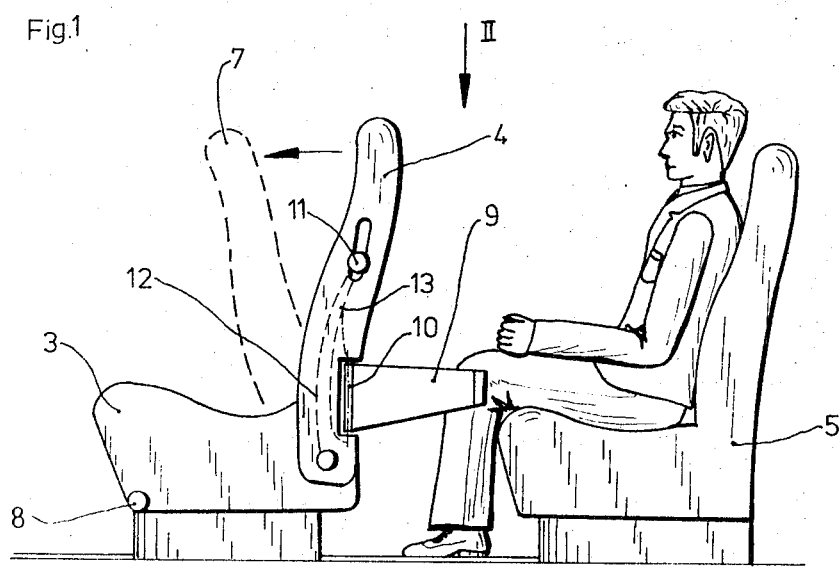
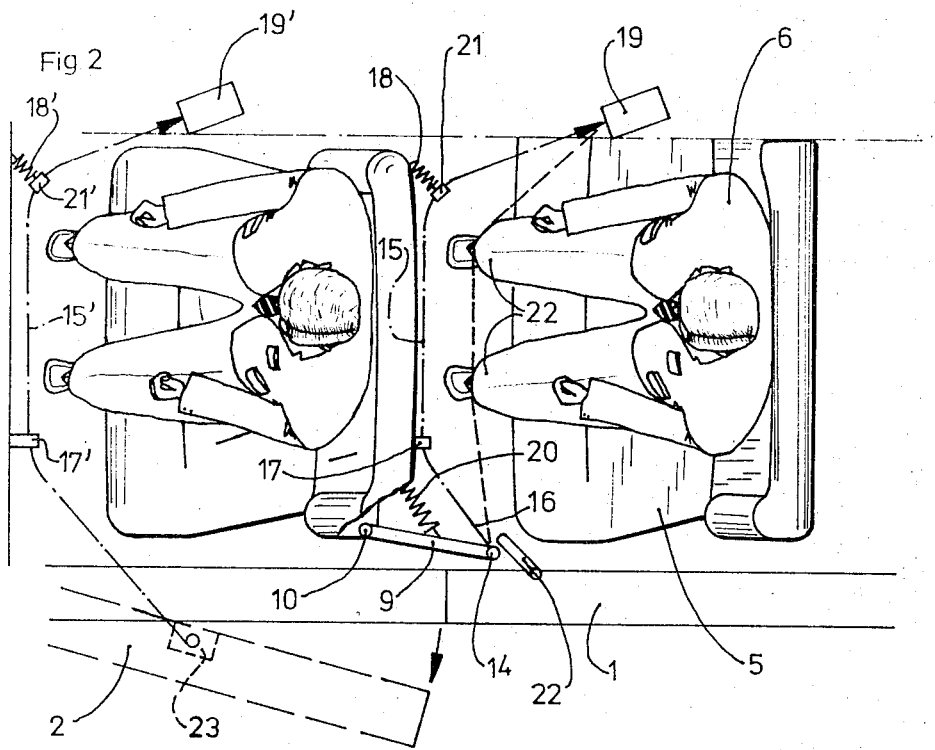

SELF-TENSIONING KNEE BELT SAFETY DEVICE

BACKGROUND OF THE INVENTION

This invention relates to safety belts for passenger vehicles and more particularly to a self-tensioning knee belt arrangement that permits the occupant freedom of motion under normal driving conditions but which automatically tightens around his knees when the vehicle is involved in a collision.

The use of safety belts has long been recognized as a means for reducing fatalities and serious injuries resulting from automobile accidents. These belts are effective because they retard the movement of the occupant relative to the vehicle during the rapid deceleration which accompanies serious collisions. As a consequence, safety belts of various descriptions have been installed in most passenger vehicles. However, a large percentage of the occupants of these vehicles do not use the safety belts provided. This is due partly to inadvertence and partly to a deliberate decision not to use the belts because of discomfort experienced when the occupants are securely fastened to their seats.

To overcome these problems, a number of automatically operating safety devices have been devised. The air bag, which is one of these automatic safety devices, rapidly inflates during an accident to cushion the occupants of the vehicle against impact with the vehicle's interior. This device, however, causes a blocking of the driver's vision which may lead to more serious consequences. A much safer device is a safety belt which automatically secures the occupant to his seat during a collision. Such a self-tensioning safety belt arrangement is disclosed in co-pending U.S. Pat. application Ser. No. 242,152 of the present inventor, which was filed Apr. 7, 1972, and is assigned to the same assignee. This co-pending application discloses the use of head, body and knee belts which allow the occupant to move about the passenger compartment under ordinary driving conditions but hold him securely in position during a collision. However, this co-pending application utilizes a complicated lever arrangement to displace the safety belts installed on the seats next to the doors of the vehicle. Besides showing a complicated arrangement for obtaining access to the seats next to the doors, the co-pending application fails to show how the belts could be installed on the rear seats of two door cars and how access to these seats could be achieved.

SUMMARY OF THE INVENTION

It is an object of this invention to provide a simple mechanism for gaining access to those seats of the vehicle which are next to its doors when self-tensioning knee belts have been installed.

It is another object of this invention to provide apparatus for gaining access to the rear seats of two door cars when self-tensioning knee belts have been installed on these rear seats.

The present invention is directed to reducing the difficulty encountered in entering and leaving a vehicle that has self-tensioning knee belts installed. With the method of the present invention a simple and attractive mechanism is utilized to displace the position of the belts installed on seats next to the doors of the vehicle. In addition, apparatus is disclosed for positioning the belts to allow access to the rear seats of two door cars.

In an illustrative embodiment of the invention, one end of the knee belt is connected to a tensioning device which is located on the side and slightly to the rear of the passenger. This tensioning device is activated on collision and increased the tension in the knee belt. The other end of the knee belt is connected to a pivotal arm which is located on the other side of the passenger. The center section of the belt is maintained at a distance from the occupant by two holding loops. The loop which is located closest to the tensioning device is attached to the interior of the vehicle by means of a spring. The other holding loop is attached directly to the interior of the vehicle. On impact the tensioning device is activated, pulling the knee belt from the holding loops and securing the passenger's knees to his seat.

In order to allow easy access to the seats of the vehicle, the pivotal arm is mounted in various ways. For the seat belt installed next to a door of the vehicle, the door of the vehicle acts as the pivotal arm. The end of the knee belt which is to be connected to the pivotal arm is connected to a spring loaded roller in the door of the vehicle. Therefore, opening the door of the vehicle will cause this belt to swing out of the way allowing access to the seat. When there is no door next to a seat which has a self-tensioning knee belt installed, such as the rear seats of a two door car, a different mechanism is provided. In this mechanism the pivotal arm is a member attached to the back rest of the front seat. This member is then connected by cables to a lever installed in the back rest of the front seat. The lever serves the dual purpose of releasing the back rest to allow access to the rear seat and causing the pivotal arm to swing against the back rest, thereby displacing the knee belt and allowing access to the rear seat.

BRIEF DESCRIPTION OF THE DRAWINGS

FIG. 1 is a side view of the passenger compartment of a vehicle provided with the safety device of the present invention; and FIG. 2 is a top view of a portion of the vehicle in accordance with direction II in FIG. 1.

DESCRIPTION OF PREFERRED EMBODIMENTS

FIGS. 1 and 2 show a side and top view, respectively, of the passenger section of a two door vehicle 1 with the self-tensioning knee belt of the present invention installed. However, it should be understood that the invention is not limited to two door vehicles and can be adapted to operate with any conventional vehicle. In FIG. 2 one of the doors 2 of the vehicle is indicated in closed position by a solid line and in the open position by a broken line. The front seat 3 with back rest 4 and the back seat 5 are indicated in FIG. 1. In order to facilitate entry into the vehicle for the back seat passenger 6, the back rest 4 can be swung forward to a position 7, shown in a broken line. It is also possible to rigidly connect the front seat 3 and the back rest 4 and to provide entry to the back seat of the vehicle by swinging the entire front seating arrangement forward around a point 8.

A pivotal arm 9 is supported in a lockable support 10 on the back rest 4. A pull button or lever 11 is arranged on the side of back rest 4 in order to disengage lock 10. This pull button 11 is connected to the locking device 10, as well as the locking device for the back rest 4, by means of cables 12 and 13 which are indicated by broken lines. A knee belt 15 for the rear passenger has one end 16 attached at an end point 14 of the pivotal arm 9. From the end 14 the knee belt is passed through holding loops 17 and 21, respectively, with the other end being connected to a tensioning device 19. Holding loop 17 is directly attached to back rest 4 and holding loop 21 is connected to back rest 4 by means of a spring 18. A spring 20 is connected between the back rest 4 and the mid-section of pivotal arm 9. To facilitate non-destructive disengagement of the holding loops, they may, for example, consist of patent fasteners or chain fasteners.

When access is desired to rear seat 5 of the vehicle the door 2 is opened and button 11 is operated. This causes the backrest lock and the pivotal arm lock 10 to be disengaged by means of cables 12 and 13 allowing the backrest to be moved forward. The action of moving the backrest forward causes the pivotal arm 9 to swing against the backrest compressing spring 20 and permitting access to back seat 5. After the passenger has taken a comfortable seated position on back seat 5 the backrest 4 is returned to its normal position. This allows spring 20 to return the pivotal arm to its normal position. For additional safety, an engagement hook 22 can be provided along with supporting lock 10 to lock the pivotal arm in its normal position. It should be noted that it is also feasible to swing the pivot arm for access by means of auxiliary mechanisms, such as hydraulic or electric motors, but this is expensive.

In the event of a collision, safety belt 15 is drawn toward the tensioning device 19, thereby applying tension to the belt. The tensioning device may be operated by means of a mechanical or hydraulic transmission system which is activated by the movement of the bumper, as disclosed in co-pending application Ser. No. 242,152 identified hereinabove. This causes the belt to be released from the holding loops and to be pulled toward the knees 22 of the passenger 6. It will be understood that the attachment of the holding loop 17 as well as the spring 18 with holding loop 21 must be stronger than the belt force produced when the back rest is moved forward for normal entry to the vehicle. However, these devices must have less strength than that required to disengage the belt from these devices on activation of tensioning device 19.

As was previously mentioned, the safety device is not limited to the protection of passengers seated in the rear of two door vehicles. Rather, the device can be generally used in four door vehicles as well as for the front passenger seats as indicted in FIG. 2. In the front passenger section illustrated in FIG. 2, an additional safety belt 15' is indicated. One end of the belt is connected to a second tensioning device 19' and the other end is connected to a holder 23 located on the door 2. The center section of the belt is kept at a distance from the knees of the passenger by means of a holding loop 17' attached directly to the dashboard of the vehicle and a holding loop 21', which is attached to the dashboard of the vehicle by means of spring 18'. With this arrangement the door 2 has the same function as the pivotal arm 9 in the rear section of the vehicle. In the case of a vehicle having a thick door, the holder 23 may be a spring loaded roller. When entrance is desired to the front seat of the vehicle, the door is opened and the attachment of the belt to holding device 23 located in the door allows easy access to the seat. When the door is closed the holding device 23 will take up any excess belt. This holding device 23 can be designed to prevent unrolling of the belt when a sharp tension is applied to it, such as when the tensioning device 19' is operated during a collision.

While the invention has been particularly shown and described with reference to preferred embodiment thereof it will be understood by those skilled in the art that various changes in form and detail may be made therein without departing from the spirit and scope of the invention. In particular, the knee belt may be arranged behind some paneling underneath the dashboard or in the back rest. Moreover, it is also possible for the pivotal arm 9 to be arranged on a side part of the vehicle. In addition the pivotal arm 9 can be moved to allow entrance to the vehicle by the movement of the door in conjunction with a lever or cable system.

I claim:

1. Self-tensioning knee belt apparatus that allows easy access to the vehicle in which it is installed and that securely holds the knees of an occupant in place in the event of a collision, comprising:
   a. a transversely extending safety belt;
   b. a pivotal arm on the entrance side of the vehicle having one end pivotally connected to the vehicle about a substantially vertical axis and having retaining means provided on said pivotal arm at a location spaced from said connection, one end of said safety belt being connected to said retaining means of said pivotal arm;
   c. locking means for locking said pivotal arm in an operative position;
   d. holding means for holding said safety belt at a distance from the knees of the occupant, said holding means allowing free passage of the belt therethrough;
   e. means located at an inboard portion of the vehicle for applying tension to the other end of said safety belt in the event of a collision, causing said safety belt to be detached from said holding means and secured about the knees of the occupant; and
   f. means for pivoting said pivotal arm to allow access to the vehicle.

2. Apparatus as claimed in claim 1 wherein said holding means comprises first and second holding means, said first holding means comprising a first releasible holding loop attached directly to the vehicle and said second holding means comprising a second releasible holding loop and a retaining spring for attaching said second holding loop to the vehicle.

3. Apparatus as claimed in claim 1 wherein said pivotal arm is a door of the vehicle and said retaining means of said pivotal arm is a belt retracting device located in said door.

4. Apparatus as claimed in claim 1 wherein said pivotal arm is in operative connection with a backrest of a front seat of the vehicle.

5. Apparatus as claimed in claim 4 wherein said means for pivoting, comprises:
   a. means for disengaging said locking means and freeing the backrest of the front seat;
   b. a pivotal spring connected between the pivotal arm and the backrest, said pivotal spring maintaining the pivotal arm in its normal position; and
   c. means for overcoming the force of the pivotal spring and pulling the pivotal arm against the backrest as the backrest is moved forward to allow access to a back seat of the vehicle.

* * * * *